Patented Jan. 23, 1951

2,539,282

UNITED STATES PATENT OFFICE 2,539,282

RARE EARTH SEPARATION BY ADSORPTION AND DESORPTION

Frank H. Spedding and Adolf F. Voigt, Ames, Iowa, assignors to the United States of America as represented by the United States Atomic Energy Commission No Drawing. Application March 23, 1949, Serial No. 83,098

42 Claims. (Cl. 260—429)

This invention relates to the separation of rare earths.

For many years one of the most difficult processes in the field of chemistry has been the separation of rare earths from each other in their pure states. Their chemical and physical properties are so similar that in general a single operation leads only to a partial separation or enrichment. In general, the best means of separating these elements has been the well-known but laborious method of fractional crystallization. Exceptions are cerium with its tetravalent state, and samarium, europium and ytterbium with their divalent states which do permit a means of separation from the normal trivalent rare earth ions.

It is an object of this invention to provide a process for the separation of rare earths.

It is another object of this invention to provide a process for the separation of immediately adjacent rare earths.

Other objects will be apparent from the following description.

We have found that rare earths, even immediately adjacent rare earths, can be separated to produce rare earths of high purity by adsorbing a mixture of the rare earths from aqueous solutions of their water-soluble inorganic salts, preferably chlorides, on a cation exchange resin and passing a citric acid solution at a controlled pH through a column of the adsorbed resin with collection of successive portions of the eluate.

The citric acid solution of this invention contains from 0.05 to 5% citric acid and has a pH of 2.5 to 7.0. This pH is obtained suitably by the addition of ammonia or ammonium hydroxide, such as concentrated ammonium hydroxide, to produce an ammonium citrate-citric acid buffer. At the higher concentrations of citric acid a suitable solution has a pH at or near the lower value of the range. At an intermediate citric acid concentration a suitable pH is at or near the intermediate value of the range and at the lower citric acid concentration, the suitable pH is at or near the higher value of the pH range. Using a 5% citric acid solution a suitable pH range for the solution is from 2.5 to 3.0 and the preferred pH range is between 2.5 and 2.8. Using a 0.5% citric acid solution a suitable pH range for the solution is between 3.5 and 4.5 and the preferred pH range is between 3.9 and 4.3. Using a 0.1% citric acid solution a suitable pH range for the solution is between 4.5 and 7.0 and the preferred pH range is between 5.0 and 6.5. There are slight variations in the preferred range depending upon whether the process is used for the separation of light rare earth elements (members of the cerium group) or heavy rare earth elements (members of the yttrium group). For example, using 0.1% citric acid, the preferred pH range of the aqueous solution is 5.5 to 6.3 for the separation of the light rare earth elements and 5.0 to 6.5 for the separation of heavy rare earth elements by the process of the present invention. The citric acid concentration used herein refers to weight percent citric acid, e. g., 5% citric acid solution refers to 50 grams of citric acid monohydrate per liter of solution. When the pH is adjusted by the addition of ammonia or ammonium hydroxide to the desired pH, the citric acid solution will not contain all of the citric acid as free acid; part of it is then present as ammonium citrate. For a particular eluting solution the suitable pH will depend upon the citric acid concentration; the suitable pH is sufficiently high to elute adsorbed rare earths and yet is sufficiently low to effectuate the selective elution accomplished by the process of the subject invention.

A preferred cation exchange resin is a sulfonated synthetic organic cation exchange resin. A sulfonated phenol-formaldehyde type of resin, which may be a resin prepared from a natural-occurring phenolic material, such as tannin, or prepared from a synthetic phenolic compound, is a suitable example of this type of sulfonated synthetic organic cation exchange resin. The sulfonated phenol-formaldehyde type of resin usually contains the sulfonic acid groups linked to the aromatic rings each through a methylene radical. Another preferred sulfonated synthetic organic cation exchange resin is a nuclear sulfonic type of synthetic organic cation exchange resin in which the sulfonic acid groups are directly attached to the aromatic nuclei in an aromatic hydrocarbon polymer.

In one embodiment of this invention an aqueous solution of water-soluble inorganic salts of rare earths is added to a column of cation exchange resin to adsorb the rare earth ions, and the citric acid solution as eluant is passed through the column of adsorbed resin. In the simple case, where the rare earth mixture contains only two rare earths, successive portions of eluate are collected, and the first portions, containing desorbed rare earth ions, are solutions of one rare earth of high purity. Intermediate portions of the eluate contain mixtures of the rear earths and a final portion of the eluate contains the other rare earth of high purity. The intermediate portions may be treated to obtain an aqueous solution of a water-soluble inorganic salt of the mixed rare earths and the resultant solution subjected to the process of this invention for a further separation of rare earths. In the case of the separation of neodymium and praseodymium the first portion of eluate contains neodymium of high purity. The intermediate portion contains a mixture of neodymium and praseodymium and the final portion contains praseodymium of high purity. In the preferred operation of this embodiment the column of resin is of such length that less than 20% of the bed is utilized for adsorption, so that the lower unadsorbed portion of resin is utilized for efficient separation of the rare earths during the desorption step, when citric acid is passed through the column for elution. In other words, the preferred amount of resin used is at least 5 times the amount required to adsorb all rare earth ions.

In another embodiment of this invention a solution of a mixture of water-soluble inorganic salts of rare earths is contacted with the resin and this adsorbed resin is placed in a column above unadsorbed resin and the citric acid solution is passed through the column.

In a third embodiment of the present invention the rare earth ions are adsorbed on the resin and eluted therefrom by the citric acid solution. The total eluate is then passed through a bed of resin and successive portions of the eluate are collected.

In a fourth embodiment a mixture of rare earths adsorbed on a cation exchange resin is separated by passing the eluant of this invention through a column of the resin containing the rare earth values, passing the eluate through a column of cation exchange resin, and collecting successive portions of the eluate from the resin that initially contained no adsorbed rare earths.

The following examples illustrate the process of this invention.

The synthetic organic cation exchange resin used in Examples I, II, and III was "Amberlite IR-1," a sulfonated phenol-formaldehyde type of cation exchange resin in which the phenolic compound was a natural-occurring material, namely, tannin. In Examples IV through VII the resin is "Amberlite IR-100," a sulfonated phenol-formaldehyde type of resin made from a synthetic phenol. Both of these resins are of the phenolic methylene sulfonic type of cation exchange resin. In Examples VIII through XVI the resin was either "Amberlite IR-100," "Dowex 50," or "Nalcite HCR," the latter two being examples of the nuclear sulfonic type of synthetic organic cation exchange resin. According to the article, J. Am. Chem. Soc. 69, 2830, "Dowex 50" is "an aromatic hydrocarbon polymer of the type described by D'Alelio in U. S. Patent 2,366,007 containing nuclear sulfonic acid groups as the sole ion-active group at any pH value." According to Table I in the article, Analytical Chemistry, 21, 87, at page 89, "Nalcite HCR" and "Dowex 50" are both the nuclear sulfonic type of synthetic organic cation exchange resin.

In Examples I through VII the cation exchange resin was first screened to remove particles greater than 20 mesh and then soaked in water. The resin slurry was added to the column and backwashed with water to remove fine resin particles, which would otherwise plug the column and thereby reduce the flow rate. In Examples I through V the resin in the column was conditioned as follows: A 5% hydrochloric acid solution was passed through the column converting the resin to the acid cycle, using a contact time of at least thirty minutes to insure complete conversion. A 2% sodium chloride solution was passed through the column to convert the resin to the sodium cycle. This treatment with acid and salt was repeated at least two more times with the resin being left finally in the acid cycle.

EXAMPLE I

Using a 16-mm. column having a resin bed length of 175 cm., an aqueous solution, containing praseodymium and neodymium chlorides, in which the rare earth content was 21% praseodymium and 79% neodymium, was introduced into the top of the resin bed to provide a weight of adsorbed rare earth ions totalling 0.65 g./cm.$^2$ of cross-section of the column, with the weight of rare earth ions calculated as rare earth oxide. An aqueous solution containing 5% citric acid adjusted to a pH of 2.53 by the addition of concentrated ammonium hydroxide was passed through the column and successive eluates were collected and analyzed for neodymium and praseodymium content. An identical experiment was carried out in which the pH of the citric acid solution was 2.75. In a similar series of experiments the pH values of citric acid solutions were 2.55 and 2.65 and the weight of adsorbed rare earth was 0.5 g. (calculated as oxide)/cm.$^2$ of cross-section of the column. The rare earth content used in this series was 43.4% praseodymium and 56.6% neodymium. Data for these four runs are shown in Table I. In all cases the flow rate of eluant was maintained between 5 and 6 cm./min.

Table I

| Per cent Nd Eluted | Per cent Purity of Eluted Nd | | | |
|---|---|---|---|---|
| | pH 2.53 | pH 2.75 | pH 2.55 | pH 2.65 |
| 10 | 99.2 | 95.0 | 95.6 | 89.1 |
| 20 | 97.8 | 93.2 | 94.5 | 89.1 |
| 30 | 97.1 | 91.0 | 93.9 | 89.1 |
| 40 | 96.5 | 89.4 | 92.8 | 87.3 |
| 50 | 95.9 | 88.4 | 91.1 | 84.9 |
| 60 | 95.1 | 88.4 | 89.1 | 82.5 |
| 70 | 94.0 | 88.4 | 87.0 | 79.6 |
| 80 | ------ | ------ | 84.0 | 77.8 |
| 90 | ------ | ------ | 79.6 | ------ |

These data show that pH has a marked effect on degree of separation and that for the preparation of rare earths of high purity it is necessary to use a citric acid solution having a pH within a narrow range.

EXAMPLE II

Using a 49-mm. column with a resin bed length of 850 cm. and a mixture of rare earth chlorides, with a rare earth content of 79.5% neodymium, 18% praseodymium and 2.5% samarium, the rare earth mixture was adsorbed on the resin as in Example I. A 5% citric acid solution at a pH of 2.65 was used for elution. The flow rate of the citric acid solution was 5 cm./min. Table II below illustrates that the first portions collected of the eluate contained neodymium of high purity.

Table II

| Per cent Nd Eluted | Per cent Purity of Eluted Nd |
|---|---|
| 10 | 99.8 |
| 20 | 99.5 |
| 30 | 99.1 |
| 40 | 98.6 |
| 50 | 97.9 |
| 60 | 97.0 |
| 70 | 95.7 |
| 80 | 93.8 |

EXAMPLE III

An aqueous solution of a 50-50 mixture of neodymium and praseodymium chlorides was introduced into a 16-mm. column containing a resin bed length of 175 cm. to adsorb the rare earths. A 5% citric acid solution with a pH of 2.55 was passed through the column and successive portions were collected and analyzed. About 22.5% of the neodymium was obtained free of praseodymium, and 50% of the neodymium was obtained greater than 98% pure. Neodymium of 98% purity was adsorbed on resin as before and a 5% citric acid solution having a pH of 2.55 was passed through the column of resin, yielding about 75% of pure neodymium. Thus, the overall yield of pure neodymium was about 38% based upon the neodymium content of the original 50–50 mixture.

EXAMPLE IV

A 1-g. mixture of 73% $Nd_2O_3$ and 27% $Pr_6O_{11}$ was dissolved in hydrochloric acid and these rare earths were adsorbed on resin having a bed length of 6 ft. in a 16-mm. column. Three of such columns of adsorbed resin were prepared. A 0.5% citric acid solution, adjusted to a certain pH by the use of concentrated ammonium hydroxide, was passed through the column in each case and successive portions of the eluate were collected and analyzed for rare earth content. The pH values in the three runs were 4.1, 4.0 and 3.9, respectively. The rare earth analyses of eluate portions are reported below in Table III expressed as percent $Nd_2O_3$ and $Pr_6O_{11}$.

Table III

| pH | Eluate | $R_2O_3$ | $Nd_2O_3$ | $Pr_6O_{11}$ |
|---|---|---|---|---|
|  | Liters | Grams | Per cent | Per cent |
| 4.1 | 0.0– 9.5 | 0 | 0 | 0 |
|  | 9.5–10.5 | 0.0033 | ---- | ---- |
|  | 10.5–11.5 | 0.0117 | ---- | ---- |
|  | 11.5–12.5 | 0.0285 | ---- | ---- |
|  | 12.5–13.5 | 0.0516 | ---- | ---- |
|  | 13.5–14.5 | 0.0750 | 100 | 0.0 |
|  | 14.5–15.5 | 0.0886 | ---- | ---- |
|  | 15.5–16.5 | 0.0997 | 95.2 | 4.8 |
|  | 16.5–17.5 | 0.1005 | ---- | ---- |
|  | 17.5–18.5 | 0.0884 | 82.3 | 17.7 |
|  | 18.5–19.5 | 0.0700 | ---- | ---- |
|  | 19.5–20.5 | 0.0518 | 58.0 | 42.0 |
|  | 20.5–21.5 | 0.0399 | ---- | ---- |
|  | 21.5–22.5 | 0.0309 | 42.3 | 57.7 |
|  | 22.5–23.5 | 0.0229 | ---- | ---- |
|  | 23.5–24.5 | 0.0189 | 30.5 | 69.5 |
| 4.0 | 0.0–16.0 | 0 | 0 | 0 |
|  | 16.0–17.0 | 0.0101 | ---- | ---- |
|  | 17.0–18.0 | 0.0230 | ---- | ---- |
|  | 19.0–20.0 | 0.0594 | ---- | ---- |
|  | 20.0–21.0 | 0.0723 | 97.8 | 2.2 |
|  | 21.0–22.0 | 0.0802 | ---- | ---- |
|  | 22.0–23.0 | 0.0775 | 94.3 | 5.7 |
|  | 23.0–24.0 | 0.073 | ---- | ---- |
|  | 24.0–25.0 | 0.0593 | 87.2 | 12.8 |
|  | 25.0–26.0 | 0.0493 | ---- | ---- |
|  | 26.0–27.0 | 0.0416 | 77.0 | 23.0 |
|  | 27.0–28.0 | 0.0340 | ---- | ---- |
|  | 28.0–29.0 | 0.0279 | 61.1 | 38.9 |
|  | 29.0–30.0 | 0.0239 | ---- | ---- |
|  | 30.0–31.0 | 0.0111 | 52.9 | 47.1 |
| 3.9 | 0.0–24.5 | 0 | 0 | 0 |
|  | 24.5–25.5 | 0.0078 | ---- | ---- |
|  | 25.5–26.5 | 0.0192 | ---- | ---- |
|  | 26.5–27.5 | 0.0346 | ---- | ---- |
|  | 27.5–28.5 | 0.0480 | ---- | ---- |
|  | 28.5–29.5 | 0.0554 | 100 | 0 |
|  | 29.5–30.5 | 0.0551 | ---- | ---- |
|  | 30.5–31.5 | 0.0546 | 100 | 0 |
|  | 31.5–32.5 | 0.0515 | ---- | ---- |
|  | 32.5–33.5 | 0.0466 | 97.3 | 2.7 |
|  | 33.5–34.5 | 0.0382 | ---- | ---- |
|  | 34.5–35.5 | 0.0347 | 92.4 | 7.6 |
|  | 35.5–36.5 | 0.0316 | ---- | ---- |
|  | 36.5–37.5 | 0.0264 | 86.0 | 14.0 |

EXAMPLE V

To illustrate the effect of pH upon the separation of neodymium and samarium three runs are reported in which 0.9 g. of a mixture of 35% $Sm_2O_3$ and 65% $Nd_2O_3$ was adsorbed from an aqueous solution of their chlorides on resin having a bed length of 28 in. and in a 16-mm. column. In the runs the 0.5% citric acid solutions used as eluant were at pH values of 5, 4.5 and 4.0, respectively. At the pH of 5 the rare earths were eluted with very little separation. The results are presented below in Table IV for the runs at pH of 4.5 and 4. The eluate flow rate was 3 cm./min.

Table IV

| pH | Eluate | $R_2O_3$ | $Sm_2O_3$ | $Nd_2O_3$ |
|---|---|---|---|---|
|  | Liters | Grams | Per cent | Per cent |
| 4.5 | 0 – 1.5 | 0 | 0 | 0 |
|  | 1.5– 2.0 | 0.1376 | 63.6 | 36.4 |
|  | 2.0– 2.5 | 0.2717 | 40.7 | 59.3 |
|  | 2.5– 3.0 | 0.1995 | 25.6 | 74.4 |
|  | 3.0– 3.5 | 0.0946 | ---- | ---- |
|  | 3.5– 4.0 | 0.0503 | 20.0 | 80.0 |
|  | 4.0– 4.5 | 0.0312 | ---- | ---- |
|  | 4.5– 5.5 | 0.0338 | 18.4 | 81.6 |
|  | 5.5– 6.5 | 0.0186 | ---- | ---- |
|  | 6.5– 7.5 | 0.0112 | 18.1 | 81.9 |
| 4.0 | 2.5– 3.0 | 0.0081 | ---- | ---- |
|  | 3.0– 3.5 | 0.0204 | 97.9 | 2.1 |
|  | 3.5– 4.0 | 0.0370 | ---- | ---- |
|  | 4.0– 4.5 | 0.0500 | 91.3 | 8.7 |
|  | 4.5– 5.0 | 0.0601 | ---- | ---- |
|  | 5.0– 5.5 | 0.0692 | 70.9 | 29.1 |
|  | 5.5– 6.0 | 0.0766 | ---- | ---- |
|  | 6.0– 6.5 | 0.0770 | 43.5 | 56.5 |
|  | 6.5– 7.0 | 0.0787 | ---- | ---- |
|  | 7.0– 7.5 | 0.0726 | 23.4 | 76.6 |
|  | 7.5– 8.0 | 0.0613 | ---- | ---- |
|  | 8.0– 8.5 | 0.0507 | 14.5 | 85.5 |
|  | 8.5– 9.0 | 0.0390 | ---- | ---- |
|  | 9.0– 9.5 | 0.0305 | 6.4 | 93.6 |
|  | 9.5–10.0 | 0.0226 | ---- | ---- |
|  | 10.0–10.5 | 0.0173 | 2.5 | 97.5 |
|  | 10.5–11.0 | 0.0137 | ---- | ---- |
|  | 11.0–11.5 | 0.0115 | ---- | 100 |

EXAMPLE VI

A pilot plant scale separation of rare earth was carried out using a 0.5% citric acid solution as the eluant. The resin bed was 8 ft. long and was in a 4-in. column. Before use, the resin bed was treated by passing through the column the following: 135 l. of 5% NaCl solution; 135 l. of 5% citrate solution at a pH of 5; 90 l. of 5% HCl solution; 135 l. of 5% citric acid solution at a pH of 5; 90 l. of 5% HCl solution; and 20 l. of distilled water. Fifty grams of a mixture of rare earth carbonates, analyzing 73.5% rare earth oxide ($R_2O_3$) which was 80.1% $Nd_2O_3$, 10.4% $Sm_2O_3$, 8.4% $Pr_6O_{11}$, and 1.0% $Gd_2O_3$, was converted to an aqueous solution of their chlorides. The aqueous solution was introduced into the column of resin to adsorb the rare earth ions. Then a 0.5% citric acid solution at a pH of 3.9 was passed through the column and successive portions of the eluate were collected and analyzed. The data in Table V below show the effective separation obtained.

Table V

| Eluate | $R_2O_3$ | $Sm_2O_3$ | $Nd_2O_3$ | $Pr_6O_{11}$ |
|---|---|---|---|---|
| Liters | Grams | Per cent | Per cent | Per cent |
| 411–457 | 0.382 | [1] 45.5 | 0 | 0 |
| 458–495 | 2.807 | [1] 64.8 | 0 | 0 |
| 496–532 | 1.685 | [1] 78.5 | 0 | 0 |
| 533–563 | 0.332 | 76.0 | 0 | 0 |
| 564–595 | 0.113 | 71.6 | 28 | 0 |
| 596–620 | 0.094 | 29.5 | 70 | 0 |
| 621–662 | 0.622 | 1.1 | 98.5 | 0 |
| 663–685 | 0.577 | Trace | 99.5 | 0 |
| 686–729 | 1.565 | 0 | 100 | 0 |
| 730–753 | 1.164 | 0 | 100 | 0 |
| 754–798 | 3.176 | 0 | 100 | 0 |
| 799–831 | 2.856 | 0 | 100 | 0 |
| 832–868 | 3.829 | 0 | 100 | 0 |
| 869–890 | 2.616 | 0 | 100 | 0 |
| 891–935 | 6.371 | 0 | 100 | 0 |
| 936–963 | 4.321 | 0 | 97.2 | 2.1 |
| 964–1,003 | 3.777 | 0 | 60.2 | 39.6 |
| 1,004–1,029 | 1.609 | 0 | 13.4 | 89.0 |
| 1,030–1,071 | 2.0169 | 0 | 2 | 96.5 |
| 1,072–1,093 | 0.667 | 0 | 0 | 95 |
| 1,094–1,138 | 0.7790 | 0 | 0 | 94.5 |

[1] The balance of $R_2O_3$ consisted of $Gd_2O_3$.

Table VI illustrates an analysis of a typical large column run.

Table VI

| Fraction | Approximate Composition |
|---|---|
| 1 | 50% $Sm_2O_3$, 30% $Gd_2O_3$. |
| 2 | 50% $Sm_2O_3$, 50% $Nd_2O_3$. |
| 3 | 2% $Sm_2O_3$, 98% $Nd_2O_3$. |
| 4 | 99.5% $Nd_2O_3$, 0.5% $Sm_2O_3$. |
| 5 | 99.9% $Nd_2O_3$, <0.05% $Sm_2O_3$, <0.1% $Pr_6O_{11}$. |
| 6 | 98% $Nd_2O_3$, 2% $Pr_6O_{11}$. |
| 7 | 90% $Nd_2O_3$, 10% $Pr_6O_{11}$. |
| 8 | 50% $Nd_2O_3$, 50% $Pr_6O_{11}$. |
| 9 | 90% $Pr_6O_{11}$, 10% $Nd_2O_3$. |
| 10 | 99% $Pr_6O_{11}$, 1% $Nd_2O_3$. |

These examples illustrate that rare earths of high purity can be obtained by the process of this invention.

The same process as described above has been applied to the separation of members of the heavy rare earths, yttrium group, consisting of the elements between gadolinium and lutecium, inclusive.

EXAMPLE VII

A rare earth oxalate mixture had a 40% loss on ignition at 800° C. Analysis of the residue, with weight percent of oxide based on percent of original oxalate, was as follows:

| | |
|---|---|
| 10% $CeO_2$ | 3% $Dy_2O_3$ |
| 7% $Nd_2O_3$ | 0.2–0.5% $Er_2O_3$ |
| 5% $Sm_2O_3$ | 0.2–0.5% $Ho_2O_3$ |
| 6% $Gd_2O_3$ | 10% $SiO_2$ |
| 15% $Y_2O_3$ | |

The oxide produced by ignition of the oxalate mixture for eight hours at 800° C. was placed in a vessel with double its volume of 6 N HCl, and the acid refluxed for two hours. A large excess of water was added and the supernatant liquid decanted and, after further dilution to an acid strength of 0.5 N or less, the rare earths therein were precipitated by the addition of oxalic acid. The precipitate was ignited to the oxide and an aqueous solution of the rare earth chlorides was prepared therefrom. A 100-gram sample of the acid-extracted rare earths was adsorbed on an 8-ft. bed of resin in a 4-in. column and a 0.5% citric acid solution at a pH of 3.9 was passed through the column. The elution data are shown below in Table VII.

column containing "Amberlite IR–100" resin in the acid cycle having a resin bed height of 120 cm. The resin was −30, +40 mesh, that is, the resin passed through a size 30 screen and was retained on a size 40 screen. Quantities of a 0.1% citric acid solution having a pH of 5.5 were prepared by dissolving 45 g. of citric acid monohydrate, 45 g. of phenol and about 33 ml. of concentrated ammonium hydroxide in 45 l. of distilled water. The resultant 0.1% citric acid solution was passed downwards through the column at a flow rate of 0.5 cm./min. After 32.5 l. of eluate had been collected, the subsequent portions of eluate contained varying amounts of rare earth salts. Quantities, each 0.5 l., of the eluate were collected after 32.5 l. had been collected and these 0.5-l. fractions were analyzed for total rare earth content. The percentages of neodymium and praseodymium in a number of the fractions were determined. From the analytical data, it was determined that 81.7% of the original Nd content of the mixture was collected, in the first eluate fractions containing rare earth values, as pure neodymium and that 82.7% of the original Pr content of the mixture was collected in last eluate fractions as pure praseodymium. The intermediate fractions contained varying ratios of neodymium and praseodymium.

Two similar adsorption-elution experiments were carried out adsorbing in each case 1.695 g. of the same rare earth mixture and using "Amberlite IR–100" with the same mesh size in a 22-mm. column having a resin bed height of 120 cm. In both experiments 0.1% citric acid solution containing 0.1% phenol and having a pH of 5.5 was used; however, the flow rates in these experiments were 1.0 and 2.0 cm./min. In the experiment with the flow rate of 1.0 cm./min., the analyses of eluate fractions showed that eluate fractions were obtained which contained 69.3% of the original Nd content as pure neodymium and 55.0% of the original Pr content as pure praseodymium. In the experiment with the flow rate of 2.0 cm./min., the analyses indicated that fractions of the eluate contained 54.7% of the original Nd content as pure neodymium and 35.4% of the original Pr content as pure praseodymium.

EXAMPLE IX

Three 22-mm. columns, each containing "Amberlite IR–100" resin in a bed height of 120 cm. and having mesh size of −30, +40, were prepared.

Table VII

| Eluate | $R_2O_3$ | $R_2O_3$ | $Er_2O_3$ | $Ho_2O_3$ | $Dy_2O_3$ | $Y_2O_3$ [1] | $Gd_2O_3$ | $Sm_2O_3$ | $Nd_2O_3$ | $Pr_2O_3$ |
|---|---|---|---|---|---|---|---|---|---|---|
| Liters | Grams | Grams per liter | Per cent | Per cent | Per cent | Per cent | Per cent | Per cent | Per cent | Per cent |
| 0–388 | 1.82 | ---- | ---- | ---- | 31.5 | ---- | ---- | ---- | ---- | ---- |
| 388–443 | 5.23 | 0.095 | 20 | 10.5 | 20 | 38 | ---- | ---- | ---- | ---- |
| 443–482 | 5.58 | 0.143 | 0 | 3 | 10 | 77 | ---- | ---- | ---- | ---- |
| 482–520 | 6.90 | 0.182 | ---- | ---- | 2 | 67.3 | 15 | 7.7 | ---- | ---- |
| 520–575 | 12.85 | 0.234 | ---- | ---- | ---- | 29.5 | 43.5 | 25 | ---- | ---- |
| 575–620 | 12.95 | 0.288 | ---- | ---- | ---- | 9.3 | 45.2 | 38 | 7.5 | ---- |
| 620–675 | 14.30 | 0.260 | ---- | ---- | ---- | 1.9 | 17.3 | 15.5 | 65.3 | ---- |
| 675–725 | 5.82 | 0.116 | ---- | ---- | ---- | ---- | 3 | 2 | 70 | 25 |
| 725–768 | 1.60 | 0.037 | ---- | ---- | ---- | ---- | ---- | ---- | 81 | 19 |

[1] $Y_2O_3$ determined by difference.

EXAMPLE VIII

A 1.695-g. mixture of 50% $Nd_2O_3$ and 50% $Pr_6O_{11}$ was dissolved in a minimum amount of hydrochloric acid and diluted to 50 ml. The resultant solution was passed through a 22-mm.

For each column 1.695 g. of a mixture of equal amounts of $Nd_2O_3$ and $Pr_6O_{11}$ was used to prepare an aqueous solution of these rare earths which were then adsorbed from the aqueous solution of their chlorides as in Example VIII. A 0.1% citric acid solution containing 0.1% phenol, and ammonium hydroxide having been added in sufficient quantity (320 ml. of 10% $NH_4OH$ solution in 45 l. of the citric acid solution) to provide a pH of 5.5 was prepared. A second aqueous solution containing 0.05% citric acid, 0.1% phenol, and the same amount of ammonium hydroxide, which provided a pH of 8.63, was prepared. A third aqueous solution containing 0.025% citric acid, 0.1% phenol and the same amount of ammonium hydroxide, which provided a pH of 9.15 was prepared. These three citric acid solutions were passed through the three columns containing the adsorbed rare earths. In each case, the flow rate was 0.5 cm./min.

The eluates from the column using the 0.1% citric acid showed a break-through or desorption of rare earth material at 30.5 l. The analyses of the fractions of the eluate showed the type of separation obtained in the experiment described in Example VIII using the same flow rate. The eluates from the column using the 0.05% citric acid solution as eluant showed a break-through of rare earth material between 39.1 and 39.5 l., at which point the pH of the eluate had risen to 3.5. Immediately subsequent fractions of the eluate showed the pH of the eluate was rising very rapidly and the fraction between 42 and 42.5 l. had a pH of 8.4. The fractions of the eluate showed some enrichment in this experiment. The first 0.366-g. quantity of rare earth values eluted contained less than 10% Pr. The first eluate fraction contained 0.0147 g. $R_2O_3$ which analyzed 5.9% Pr. In the experiment using the 0.025% citric acid, there were no rare earth values present in any fraction of the eluate up to 53 l., even though the pH of the eluate had risen to 9.1 at 47.1.

The data in the experiments using 0.05% and 0.025% citric acid, in conjunction with the data of the other examples, indicate that 0.05% is about the minimum concentration of citric acid for carrying out the process of this invention and that at about 0.05% citric acid the pH of the eluant should be below 8.63, namely, should be no higher than about 7.0 to obtain at least an adequate partial separation of rare earth elements and preferably to obtain quantities of pure rare earth element.

EXAMPLE X

A 1.695-g. mixture of equal amounts of neodymium and praseodymium oxides was used to prepare an aqueous solution of their chlorides and the rare earths were adsorbed therefrom as in Example VIII. However, the 120-cm. height of resin bed in the 22-mm. column was −30, +40 mesh "Dowex 50" in the acid cycle due to pretreatment with 5% HCl solution. The rare earths were eluted at a flow rate for the eluate of 0.5 cm./min. using a 0.5% citric acid solution having a pH of 4.3. The analyses of the eluate fractions showed that 78.0% of the original Nd content was obtained as pure neodymium and 91.8% of the original Pr content was obtained as pure praseodymium.

EXAMPLE XI

A mixture, 1.71 g. as $R_2O_3$, of rare earth elements which analyzed 33.6% $Sm_2O_3$, 28.8% $Nd_2O_3$ and 34.7% $Pr_6O_{11}$ was adsorbed from an aqueous solution of their chlorides on a 120-cm. bed of "Amberlite IR–100" in a 22-mm. column. The resin was −30, +40 mesh and was in the hydrogen or acid cycle prior to the adsorption step. A 0.1% citric acid solution containing 0.1% phenol and having a pH of 5.30 due to the addition of ammonium hydroxide was passed through the column. Fractions of the eluate were collected and analyzed for total rare earth content as well as the individual rare earth elements. The resultant data indicated that fractions of the eluate were obtained which contained 80.2% of the original Sm content as pure samarium, 64.2% of the original Nd content as pure neodymium, and 71.8% of the original Pr content as pure praseodymium. The rare earth content of the first fractions of the eluate was pure samarium. In subsequent fractions of the eluate samarium was present with neodymium. These fractions contained decreasing amounts of samarium values. After all of the samarium had been eluted, the next fractions of the eluate contained pure neodymium values. Still later fractions contained neodymium and praseodymium values. The final fractions of the eluate contained pure praseodymium values. The total recovery of rare earth values by elution was 91.8%.

EXAMPLE XII

A 22-mm. column containing a bed height of 60 cm. of "Nalcite HCR" spheres having a mesh of −30, +40 was prepared in the acid cycle and water-rinsed. A mixture of neodymium and samarium was adsorbed from an aqueous solution of their chlorides prepared from 1.713 g. of a mixture containing 50% $Nd_2O_3$ and 50% $Sm_2O_3$. A 0.1% citric acid solution containing 0.1% phenol and having a pH value of 6.30 due to the addition of ammonium hydroxide was then passed through the column at a flow rate of 0.25 cm./min. At an eluate volume of 37.9 l. the rare earth material was beginning to be eluted. Analyses of collected fractions of the eluate were made and the data indicated that the first rare earth-containing fractions contained 62.5% of the original Sm content as pure samarium. The intermediate fractions contained mixtures of samarium and neodymium values and the final fractions of the eluate contained 61.2% of the original Nd content as pure neodymium. The total recovery of rare earth values from the resin by elution with the citric acid solution was 97.9%.

In an experiment under identical conditions, except "Dowex 50" spheres of −30, +40 mesh were used, fractions of the eluate contained 70.2% of the original Sm content as pure samarium and other final fractions contained 70.9% of the original Nd content as pure neodymium. The total recovery of rare earth values from the resin by elution was 98.9%.

EXAMPLE XIII

Three 22-mm. columns were loaded with −30, +40 mesh "Amberlite IR–100" resin to provide, respectively, bed heights of 30, 60, and 90 cm. A mixture containing equal amounts of samarium and neodymium was used to load the columns with 1.65, 3.30, and 4.95 g. ($R_2O_3$), respectively, of adsorbed rare earth material. Through each column a 0.1% citric acid solution containing 0.1% phenol and having a pH of 6.0 due to the addition of ammonium hydroxide was passed at a flow rate of 0.25 cm./mm.

Table VIII

| | Resin Bed Height, cm. | | |
|---|---|---|---|
| | 30 | 60 | 90 |
| Break-through volume, l | 5.8 | 11.5 | 17.4 |
| Total elution volume, l | 13.0 | 24.0 | 36.0 |
| Recovery of $R_2O_3$, per cent | 97.2 | 98.5 | 100 |
| $Sm_2O_3$ obtainable pure, per cent | 61.7 | 77.8 | 90.5 |
| $Nd_2O_3$ obtainable pure, per cent | 64.0 | 82.2 | 88.5 |

EXAMPLE XIV

Three 4-in. columns were loaded with −30, +40 mesh "Amberlite IR-100" resin each to a bed height of 4 ft. On each column of resin rare earth materials were adsorbed from an aliquot of an aqueous solution having a pH of 1.8 and containing rare earth chlorides obtained by dissolution in hydrochloric acid of 286 g. of a material containing 39% $Yb_2O_3$, 12% $Tm_2O_3$, 5% $Er_2O_3$, 1% $Ho_2O_3$, and 43% Lu and Y oxides (by difference). Through each column a 0.1% citric acid solution having a pH of 6.0 due to the addition of ammonium hydroxide was passed at a flow rate of 40 ml./min. The total volume of eluate from each column was about 780 l. The analyses of the eluate fractions showed that there was a total separation effected at least in some eluate fractions with regard to non-adjacent heavy rare earth elements and at least a fair degree of enrichment with respect to immediately adjacent heavy rare earth elements. Further treatment by the process of this invention of enriched mixtures will permit additional recovery of pure heavy rare earths.

EXAMPLE XV

Two series of 25-mm. columns each containing a 120-cm. bed height of −30, +40 mesh "Amberlite IR-100" resin were prepared and a mixture of samarium and gadolinium was adsorbed on each column in the amount of 1.4976 g., calculated as $R_2O_3$, in which the mixture was 49% $Sm_2O_3$ and 51% $Gd_2O_3$. In one of the series of columns 0.5% citric acid solutions adjusted to various pH values with ammonium hydroxide were used as the eluant at various flow rates. In the other series 0.1% citric acid solutions adjusted with ammonium hydroxide to various pH values were used as eluants at various flow rates. The various eluate fractions of both series of experiments were analyzed for total $R_2O_3$ content as well as $Sm_2O_3$ and $Gd_2O_3$ content.

Assuming a theoretically complete separation of gadolinium and samarium, and graphically representing the amount eluted of cumulative rare earth material ($R_2O_3$) as the abscissa and the percent $Sm_2O_3$ in the various eluted fractions of rare earth materials as the ordinate, the line would coincide with the abscissa until 0.764 g. of $R_2O_3$ had been eluted. Then this line for complete separation would rise vertically and indicate elution of pure $Sm_2O_3$. The curve would remain at that level for the balance of the elution. Using the same coordinates, the line representing no separation in the elution would be a straight line at the 49% $Sm_2O_3$ level from initial elution until all of the $R_2O_3$ would be eluted. Upon plotting a curve for an experiment in which some separation or enrichment occurs, there is an area in the graph between the line for no separation and the curve from that experiment. The ratio of that area to the area obtained by complete separation, multiplied by 100, is referred to in the following table as "percent separation." This percent separation is an indication of the degree of enrichment obtained.

Table IX

| Per cent Citric Acid in Eluant | pH of Eluant | Flow Rate, ml./min. | Per cent Separation |
|---|---|---|---|
| 0.5 | 4.5 | 2 | 9 |
| 0.5 | 4.4 | 2 | 11 |
| 0.5 | 4.4 | 1 | 9 |
| 0.5 | 4.3 | 2 | 10 |
| 0.5 | 4.2 | 2 | 9 |
| 0.5 | 4.1 | 2 | 26 |
| 0.5 | 4.0 | 2 | 24 |
| 0.5 | 3.9 | 2 | 20 |
| 0.5 | 3.8 | 2 | 21 |
| 0.5 | 3.8 | 1 | 18 |
| 0.5 | 3.7 | 2 | 19 |
| 0.5 | 3.6 | 2 | 24 |
| 0.1 | 5.3 | 2 | 44 |
| 0.1 | 5.3 | 1 | 40 |
| 0.1 | 5.5 | 2 | 37 |
| 0.1 | 5.5 | 1 | 43 |
| 0.1 | 5.7 | 2 | 17 |
| 0.1 | 5.7 | 1 | 22 |

In an analogous experiment, using a 240-cm. bed height instead of the usual 120-cm. height and using 0.1% citric acid having a pH of 5.5 with a flow rate of 2 ml./min. there was 20% separation.

From the foregoing data of this example, it is apparent that 0.1% citric acid is preferred to 0.5% citric acid for increasing the degree of separation of heavy rare earth elements.

EXAMPLE XVI

A series of columns was loaded with −30, +40 mesh cation exchange resin and on each a mixture of heavy rare earth elements was adsorbed from an aqueous solution of their salts. The aqueous solution for each adsorption was obtained from a 1.473-g. rare earth oxide sample that analyzed 19% $Dy_2O_3$, 1% $Sm_2O_3$, 2% $Ho_2O_3$, 43% $Gd_2O_3$, and 35% $Y_2O_3$. A series of 0.1% citric acid solutions adjusted to pH values between 5.7 and 6.3 was prepared. These solutions were used in a series of desorption experiments with the foregoing columns of resin containing adsorbed rare earth elements. The flow rate in all cases was 2 ml./min. The eluate fractions were analyzed and the dysprosium analyses were used as an indication of the degree of separation or enrichment obtained in these experiments. The dysprosium analyses were used in the same way as the samarium analyses were used in Example XV for determining the degree of separation, which was expressed as percent Dy separation. Table X below presents the results of this series of experiments.

Table X

| pH of Eluant | Bed Height, cm. | Per Cent Dy Separation |
|---|---|---|
| 6.0 | 30 | 29 |
| 6.0 | 60 | 35 |
| 6.0 | 90 | 39 |
| 6.0 | 120 | 34 |
| 6.3 | 60 | 35 |
| 6.1 | 60 | 33 |
| 5.9 | 60 | 36 |
| 5.7 | 60 | 33 |

An analogous experiment was performed using a 60-cm. bed height of −60, +80 mesh resin and using 0.1% citric acid at a pH of 6.0. There was 38% Dy separation.

While preferred embodiments of the present invention are described above, other modifications may be made without departing from the spirit and scope of the invention. Thus, this invention is not to be limited to the examples but it is to be limited only by the appended claims.

This application is a continuation-in-part of our copending application Serial No. 769,326, filed August 18, 1947, now abandoned.

What is claimed is:

1. A process for the separation of rare earths, which comprises contacting an aqueous solution containing water-soluble inorganic salts of rare earths with a cation exchange resin to adsorb said rare earths on the resin, passing through a column of the adsorbed resin an aqueous solution containing from 0.05% to 5% citric acid and having a pH from 2.5 to 7.0, passing the eluate through a column of cation exchange resin, and collecting successive portions of the resultant eluate.

2. A process for the separation of rare earths, which comprises passing an aqueous solution containing water-soluble inorganic salts of rare earths through a column of cation exchange resin to adsorb said rare earths on part of the resin, passing through the column of the resin an aqueous solution containing from 0.05 to 5% citric acid and having a pH from 2.5 to 7.0, and collecting successive portions of the resultant eluate.

3. The process of claim 2 wherein the amount of resin used is at least 5 times the amount required to adsorb the rare earths.

4. A process for the separation of rare earths, which comprises passing an aqueous solution containing a mixture of rare earth chlorides through a column of a sulfonated synthetic organic cation exchange resin to adsorb said rare earths on part of the resin, passing through the column of the resin an aqueous solution containing from 0.05 to 5% citric acid and having a pH from 2.5 to 7.0, and collecting successive portions of the resultant eluate.

5. A process for the separation of rare earths, which comprises passing an aqueous solution containing a mixture of rare earth chlorides through a column of a sulfonated phenol-formaldehyde type of cation exchange resin to adsorb said rare earths on part of the resin, passing through the column of the resin an aqueous solution containing from 0.05 to 5% citric acid and having a pH from 2.5 to 7.0, and collecting successive portions of the resultant eluate.

6. The process of claim 5 wherein the phenol used in the preparation of the resin is a natural-occurring phenolic compound.

7. The process of claim 5 wherein the phenol used in the preparation of the resin is a synthetic phenolic compound.

8. A process for the separation of rare earths, which comprises passing an aqueous solution containing a mixture of rare earth chlorides through a column of a nuclear sulfonic type of cation exchange resin to adsorb said rare earths on part of the resin, passing through the column of the resin an aqueous solution containing from 0.05 to 5% citric acid and having a pH from 2.5 to 7.0, and collecting successive portions of the resultant eluate.

9. A process for the separation of immediately adjacent rare earths, which comprises passing an aqueous solution containing a mixture of immediately adjacent rare earth chlorides through a column of a sulfonated phenol-formaldehyde type of cation exchange resin to adsorb said rare earths on part of the resin, passing through the column of the resin an aqueous solution containing from 0.05 to 5% citric acid and having a pH from 2.5 to 7.0, and collecting successive portions of the resultant eluate.

10. The process of claim 9 wherein the phenol used in the preparation of the resin is a natural-occurring phenolic compound.

11. The process of claim 9 wherein the phenol used in the preparation of the resin is a synthetic phenolic compound.

12. A process for the separation of immediately adjacent rare earths, which comprises passing an aqueous solution containing a mixture of immediately adjacent rare earth chlorides through a column of a nuclear sulfonic type of cation exchange resin to adsorb said rare earths on part of the resin, passing through the column of the resin an aqueous solution containing from 0.05 to 5% citric acid and having a pH from 2.5 to 7.0, and collecting successive portions of the resultant eluate.

13. A process for the separation of neodymium and praseodymium, which comprises passing an aqueous solution of neodymium and praseodymium chlorides through a column of a cation exchange resin to adsorb said neodymium and praseodymium on part of the resin, passing through the column of the resin an aqueous solution containing from 0.05 to 5% citric acid and having a pH from 2.5 to 7.0, and collecting successive portions of the resultant eluate.

14. A process for the separation of neodymium and praseodymium, which comprises passing an aqueous solution of neodymium and praseodymium chlorides through a column of a sulfonated phenol-formaldehyde type of cation exchange resin to adsorb said neodymium and praseodymium on part of the resin, passing through the column of the resin an aqueous solution containing from 0.05 to 5% citric acid and having a pH from 2.5 to 7.0, and collecting successive portions of the resultant eluate.

15. The process of claim 14 wherein the citric acid solution contains 5% citric acid, and has a pH from 2.5 to 3.0.

16. The process of claim 14 wherein the citric acid solution contains 0.5% citric acid and has a pH from 3.5 to 4.5.

17. The process of claim 14 wherein the citric acid solution contains 0.1% citric acid and has a pH from 5.0 to 6.5.

18. A process for the separation of neodymium and praseodymium, which comprises passing an aqueous solution of neodymium and praseodymium chlorides through a column of a sulfonated synthetic organic cation exchange resin to adsorb said neodymium and praseodymium on the resin and wherein the amount of resin is at least 5 times the amount required to adsorb all of the neodymium and praseodymium, passing through the column of the resin an aqueous solution containing from 0.05 to 5% citric acid and having a pH from 2.5 to 7.0, and collecting successive portions of the resultant eluate.

19. A process for the separation of neodymium and praseodymium, which comprises passing an aqueous solution of neodymium and praseodymium chlorides through a column of a sulfonated phenol-formaldehyde type of cation exchange resin to adsorb said neodymium and praseodymium on the resin and wherein the amount of resin is at least 5 times the amount required to adsorb all of the neodymium and praseodymium, passing through the column of the resin an aqueous solution containing from 0.05 to 5% citric acid and having a pH from 2.5 to 7.0, and collecting successive portions of the resultant eluate.

20. A process for the separation of neodymium and praseodymium, which comprises passing an aqueous solution of neodymium and praseodymium chlorides through a column of a nuclear sulfonic type of cation exchange resin to adsorb said neodymium and praseodymium on the resin and wherein the amount of resin is at least 5 times the amount required to adsorb all of the neodymium and praseodymium, passing through the column of the resin an aqueous solution containing from 0.05 to 5% citric acid and having a pH from 2.5 to 7.0, and collecting successive portions of the resultant eluate.

21. A process for the separation of neodymium and praseodymium, which comprises passing an aqueous solution of neodymium and praseodymium chlorides through a column of a sulfonated synthetic organic cation exchange resin to adsorb said neodymium and praseodymium on the resin and wherein the amount of resin is at least 5 times the amount required to adsorb all of the neodymium and praseodymium, passing through the column of the resin an aqueous solution containing from 0.05 to 5% citric acid and having a pH from 2.5 to 7.0, and collecting a first portion of eluate containing neodymium of high purity, an intermediate portion of eluate containing a mixture of neodymium and praseodymium, and a final portion containing praseodymium of high purity.

22. A process for the separation of samarium and neodymium, which comprises passing an aqueous solution of samarium and neodymium chlorides through a column of a sulfonated synthetic organic cation exchange resin to adsorb said samarium and neodymium on the resin and wherein the amount of resin is at least 5 times the amount required to adsorb all of the samarium and neodymium, passing through the column of the resin an aqueous solution containing from 0.05 to 5% citric acid and having a pH from 2.5 to 7.0, and collecting a first portion of eluate containing samarium of high purity, an intermediate portion of eluate containing a mixture of samarium and neodymium, and a final portion containing neodymium of high purity.

23. The process of claim 22 wherein the citric acid solution contains 0.1% citric acid, and has a pH from 5.0 to 6.5.

24. A process for the separation of heavy rare earths, which comprises passing an aqueous solution of heavy rare earth chlorides through a column of a sulfonated synthetic organic cation exchange resin to adsorb said heavy rare earths on the resin and wherein the amount of resin is at least 5 times the amount required to adsorb all of the heavy rare earths, passing through the column of the resin an aqueous solution containing 0.1% citric acid and having a pH from 5.0 to 6.5, and collecting successive portions of the resultant eluate.

25. A process for the separation of rare earths, which comprises passing through a column of cation exchange resin containing a mixture of rare earths adsorbed on its upper part an aqueous solution containing from 0.05 to 5% citric acid and having a pH from 2.5 to 7.0, and collecting successive portions of the resultant eluate.

26. The process of claim 25 wherein the resin is a sulfonated synthetic organic cation exchange resin and the upper part of the resin constitutes less than one-fifth of the total quantity of resin.

27. The process of claim 26 wherein the citric acid solution contains 0.1% citric acid and has a pH from 5.0 to 6.5.

28. A process for the separation of rare earths, which comprises contacting an aqueous solution containing water-soluble inorganic salts of rare earths with a cation exchange resin to adsorb said rare earths on the resin, passing through a column of the adsorbed resin an aqueous solution containing from 0.5 to 5% citric acid and having a pH from 2.5 to 4.1, passing the eluate through a column of cation exchange resin, and collecting successive portions of the resultant eluate.

29. A process for the separation of rare earths, which comprises passing an aqueous solution containing water-soluble inorganic salts of rare earths through a column of cation exchange resin to adsorb said rare earths on part of the resin, passing through the column of the resin an aqueous solution containing from 0.5 to 5% citric acid and having a pH from 2.5 to 4.1, and collecting successive portions of the resultant eluate.

30. The process of claim 29 wherein the amount of resin used is at least 5 times the amount required to adsorb the rare earths.

31. A process for the separation of rare earths, which comprises passing an aqueous solution containing a mixture of rare earth chlorides through a column of a sulfonated phenol-formaldehyde type of cation exchange resin to adsorb said rare earths on part of the resin, passing through the column of the resin an aqueous solution containing from 0.5 to 5% citric acid and having a pH from 2.5 to 4.1, and collecting successive portions of the resultant eluate.

32. The process of claim 31 wherein the phenol used in the preparation of the resin is a natural-occurring phenolic compound.

33. The process of claim 31 wherein the phenol used in the preparation of the resin is a synthetic phenolic compound.

34. A process for the separation of immediately adjacent rare earths, which comprises passing an aqueous solution containing a mixture of immediately adjacent rare earth chlorides through a column of a sulfonated phenol-formaldehyde type of cation exchange resin to adsorb said rare earths on part of the resin, passing through the column of the resin an aqueous solution containing from 0.5 to 5% citric acid and having a pH from 2.5 to 4.1, and collecting successive portions of the resultant eluate.

35. The process of claim 34 wherein the phenol used in the preparation of the resin is a natural-occurring phenolic compound.

36. The process of claim 34 wherein the phenol used in the preparation of the resin is a synthetic phenolic compound.

37. The process for the separation of neodymium and praseodymium, which comprises passing an aqueous solution of neodymium and praseodymium chlorides through a column of a cation exchange resin to adsorb said neodymium and praseodymium on part of the resin, passing through the column of the resin an aqueous solution containing from 0.5 to 5% citric acid and